Patented Dec. 27, 1949

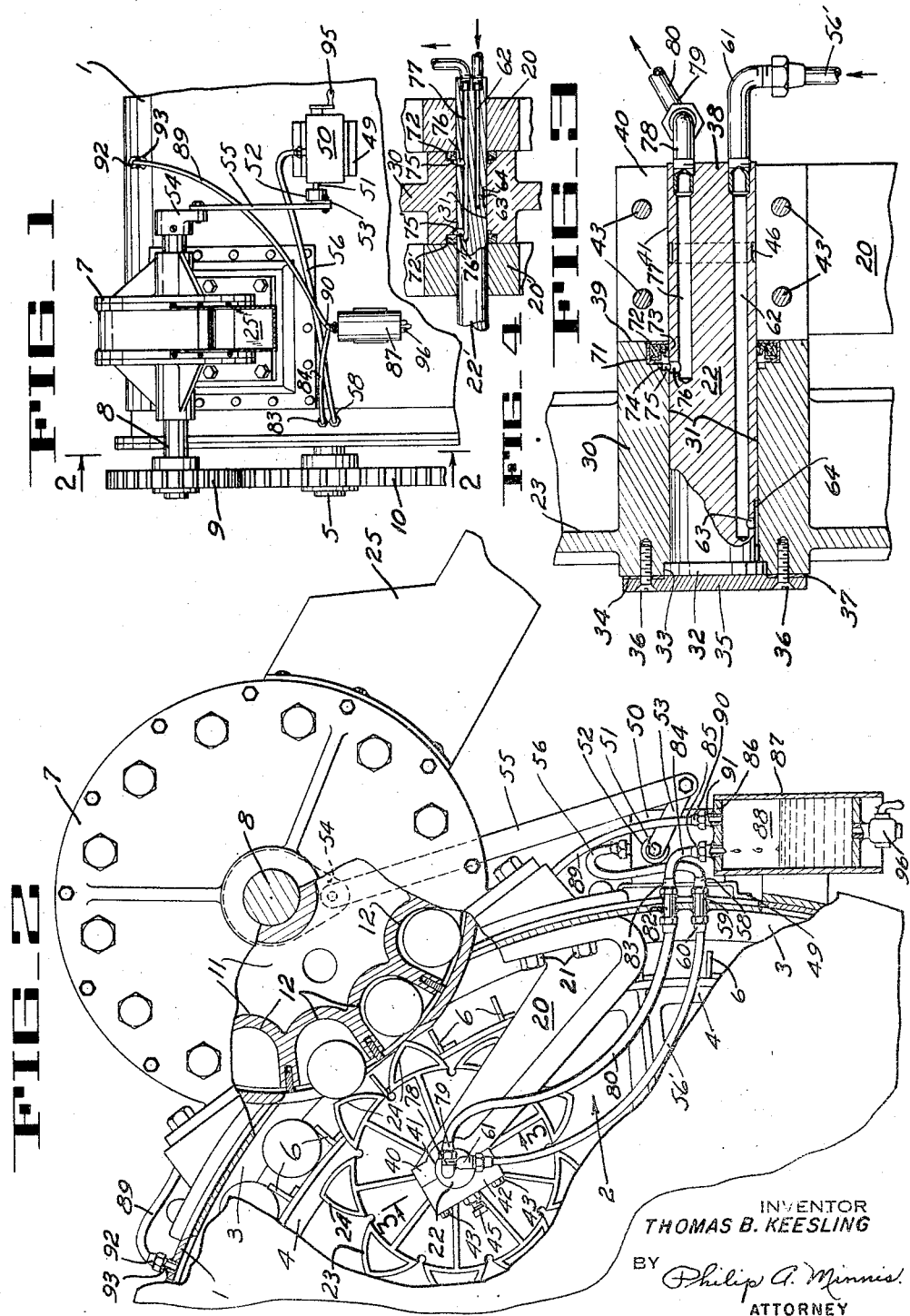

2,492,484

UNITED STATES PATENT OFFICE 2,492,484

BEARING LUBRICATION AND SEALING

Thomas B. Keesling, Campbell, Calif., assignor to Food Machinery and Chemical Corporation, a corporation of Delaware Application February 20, 1946, Serial No. 648,983

11 Claims. (Cl. 308—36.3)

This invention appertains to lubricator apparatus and relates particularly to an improved apparatus for lubricating bearings within a pressure chamber.

Heretofore, it has been the custom to supply lubricant by force to bearings exposed to pressure prevailing in a pressure chamber in order to properly distribute the lubricant over the entire bearing surface. Obviously, the pressure of the lubricant must exceed the pressure prevailing in the chamber and, consequently, lubricant will seep into the chamber and collect upon the commodity treated therein. This has objectionable effects particularly in cases where the commodity to be treated is canned goods because the lubricant collects on the walls of the cans and prevents the adherence of gummed labels to the cans.

The present invention has as one of its objects to provide an apparatus for lubricating bearings within a pressure chamber without loss or seepage of lubricant into the chamber.

Another object is to provide an apparatus for utilizing the pressure within the chamber for automatically equalizing the pressure of the lubricant with the pressure prevailing in the chamber.

Another object is to provide an apparatus for preventing the seepage of the pressure medium into the bearing to prevent the pressure medium from displacing the lubricant and thus assure that the bearing will never run dry or become scorched.

These and other objects and advantages will become more apparent from the following description taken in conjunction with the accompanying drawings wherein:

Fig. 1 is a partial elevation of a pressure treating apparatus embodying the present invention.

Fig. 2 is an enlarged section taken along line 2—2 in Fig. 1, certain portions being broken away for purposes of illustration.

Fig. 3 is an enlarged longitudinal section through a bearing taken along line 3—3 in Fig. 2.

Fig. 4 is a section similar to Fig. 3, but at a smaller scale, illustrating a different form of bearing embodying the present invention.

For purposes of this disclosure, the present invention is illustrated in conjunction with an ejector mechanism for cookers such as the one described and shown in U. S. Letters Patent No. 2,152,107 issued to A. R. Thompson, March 28, 1939. However, it is to be understood that the invention herein is generally applicable to various types of bearings in which a portion of the bearing is exposed to pressure prevailing in a pressure chamber and, therefore, is not limited to the specific arrangement shown in the instant drawings. Since the construction and operation of the ejector and cooker are clearly illustrated and described in the patent above referred to, only so much of the patented structure will be described herein as necessary for a proper understanding of the present invention.

A portion of the pressure cooker is shown in Figs. 1 and 2 of the accompanying drawings and comprises a horizontally disposed shell 1 the ends of which are sealed to provide a chamber 2 for retaining therein heat treating medium, such as steam under pressure. Containers, such as cans, enter the chamber through a feed valve, not shown, in a manner well known in the art and are conveyed through the chamber 2 along a spiral track 3 by a reel 4 rotatably mounted coaxially within the shell on a shaft 5. The shaft 5 is rotated by a suitable drive mechanism, not shown, to turn the reel which has a plurality of pusher bars 6 on its periphery cooperating with the track 3 to advance the cans through the chamber 2. The cans, after having been processed in the chamber 2, leave the shell 1 through a discharge valve 7 which is of conventional design as will be noted by reference to the above mentioned patent.

The discharge valve 7 has a shaft 8 to which is secured a gear 9 meshing with a gear 10 in turn secured to the drive shaft 5 so that the cans are readily transferred in timed relation from the reel 4 into pockets 12 in the discharge valve.

Within the shell 1 is a bracket 20 which is bolted as shown at 21 in Fig. 2 to the inner wall of the shell and on this bracket 20 a shaft 22 is supported parallel to the shaft 8 of the discharge valve. Rotatably mounted on the shaft 22 is an ejector wheel 23 having peripheral teeth 24 which project from within the circumference of the reel 4 into the space between the pusher bars 6 to eject the cans from the reel into the discharge valve.

The ejector wheel is driven by the pusher bars 6 as the teeth 24 raise the cans out of the reel in a manner similar to that explained in the aforementioned patent, thereby transferring the cans into the pockets 12 of the discharge valve which in turn convey the cans to a discharge chute 25.

Both the shaft 22 and the ejector wheel 23 are within the shell 1 and are therefore subjected to the pressure medium, i. e., the heat treating medium, therein. The ejector wheel 23 is provided with a hub structure 30 forming a bearing sleeve 31 which fits over the shaft 22 for rotation relative thereto as is best shown in Fig. 3. One end of the shaft 22 (left end Fig. 3) has a retaining rim or flange 32 thereon which fits into an annular shoulder 33 formed in the adjacent face 34 of the hub. A plate 35 is secured to the face 34 by machine screws 36 and a gasket 37 is placed between the plate and face to completely close and seal the free end of the shaft from the pressure prevailing in the chamber 2. The other end 38 of the shaft 22 extends beyond the opposite face 39 of the hub 30 into the bracket 20, the upper end of which is in the form of a split boss. The split boss comprises an integral half 40 having a seat formation 41 which receives the end 38 of the shaft, and a cap 42 which fits over the shaft and is bolted as shown at 43 to the flanges of the half boss 40 to secure the shaft 22 in position. The shaft 22 is secured against lateral movement by a set screw 45 (Fig. 2) threaded through the cap 42 and having its end extending into an annular groove 46 of the shaft 22.

Mounted on the outside wall of the shell 1 on a bracket 49 is an oil pump 50 having a drive shaft 51 with a pawl and ratchet unit 52 secured thereto. The pawl side of the unit 52 has a lever 53 operatively associated therewith to drive the ratchet and shaft 51 of the pump in the conventional manner. Secured to the shaft 8 of the discharge valve 7 is a crank 54 and this crank is connected to the lever 53 by a pitman 55 so as to drive the pump in unison with the operation of the discharge valve.

Connected to the discharge side of the pump 50 is a feed conduit 56 the opposite end 58 of which is connected to a nipple 59 which passes through the wall of the shell. The nipple 59 is properly sealed with respect to the wall of the shell to prevent leakage of heat treating medium from the shell and within the shell the nipple 59 is connected to one end 60 of a continuation 56' of the conduit 56. The opposite end of the conduit 56' is connected to a fitting 61 threaded into the open end of a lubricant feed passage 62 extending longitudinally in the shaft 22. The feed passage 62 terminates adjacent the annular rim or flange 32 of the shaft and has a discharge port 63 opening into a flattened portion 64 on the periphery of the shaft to admit lubricant from the passage 62 to the bearing surfaces of the shaft 22 and bearing sleeve 31.

Under normal circumstances lubricant is supplied by force from the pump 50 through the conduit 56, 56' and the passage 62 into the space between the bearing surfaces of the shaft and sleeve for uniform distribution over the same. However, when the pressure within the shell is greater than the pressure of the lubricant from the oil pump 50, normal distribution of lubricant over the bearing surfaces adjacent the face 39 of the hub 30 is checked, leaving certain portions of the bearing surfaces of the sleeve and shaft without lubricant. Consequently, in order to assure complete lubrication of these bearing surfaces it was heretofore necessary to adjust the pump 50 to cause a sufficient quantity of lubricant to flow from the pump to thereby overcome the pressure of the heating medium in the shell. Obviously, with the pressure of the lubricant substantially in excess of the pressure of the heating medium there is a seepage of oil into the shell and the oil will collect on the cans causing difficulty in labeling after the cans are discharged due to the fact that the labels will not stick to oil coated cans. In order to minimize the leakage of oil from the bearing it was heretofore necessary that the person attending the apparatus periodically inspect the bearings to see how much lubricant was leaking from them and by judgment adjust the pump to supply only so much lubricant as was necessary to amply cover the bearing surfaces and minimize the amount of leakage. This requires constant care under any circumstance and more particularly in a cooker because various commodities are treated therein and differing batches of canned goods require a much greater or a much lesser pressure in order to properly treat them. Obviously, in previously known lubricators it has been necessary to readjust the lubricator pump when a different commodity is to be treated so as to regulate the force of the lubricant to suit the particular pressure prevailing within the shell 1. Such constant care and periodical readjustment of the lubricator pump entail time and expense and at best do not overcome the objectionable seepage of lubricant into the chamber or leakage of treating medium into the bearing.

In accordance with the present invention the pressure of the lubricant is automatically equalized with the pressure of the treating medium within the shell to prevent leakage of lubricant from the bearing into the shell and also to prevent the treating medium from entering the bearing. To accomplish the equalization of pressure of the lubricant and treating medium in the present disclosure, the face 39 of the hub 30 which abuts the adjacent face of the boss 40 and cap 42 is provided with an annular recess 71 and a sealing ring 72 is pressed into the recess 71 and has its inner peripheral lip 73 in sealing engagement with the periphery of the shaft 22. Adjacent the recess 71 is another and smaller recess 74 which forms an annular oil retaining groove 75 at the inner side of the sealing ring 72 when the latter is in place. The shaft 22 has a port 76 formed therein to communicate the annular groove 75 with a lubricant discharge passage 77 extending longitudinally of the shaft 22 and threaded into the outer end of the discharge passage 77 is a pipe fitting 78 having one end 79 of a discharge conduit 80 connected thereto. The other end of the conduit 80 is connected to a nipple 82 extending through the side wall of the shell to which it is properly welded to prevent leakage of heat treating medium around the nipple. Outside the shell the nipple 82 is connected to one end 83 of a conduit 84 the other end of which is connected to a fitting 85 threaded into the upper wall 86 of a tank or receptacle 87 so as to collect lubricant discharging from the bearing by way of the passage 77 and conduits 80 and 84.

The tank 87 is secured to the outside wall of the shell as shown in Figs. 1 and 2 and provides an air tight chamber 88. Communicating with this chamber 88 is a conduit 89 having its lower end 90 connected to a fitting 91 threaded into the upper wall 86 of the tank 87 and the other end 92 of conduit 89 is connected to a nipple 93 extending through the shell 1 and suitably welded to the wall of the shell to prevent leakage of treating medium therefrom around the nipple. In this manner, the air tight chamber 88 is subjected to the pressure prevailing in the treating chamber 2 and a back pressure is established on the lubricant discharging from the oil retaining recess 75 through the discharge passage 77.

Prior to operation, the pump 50 is filled with lubricant in the form of oil and a crank 95 secured to the drive shaft 51 of the pump is rotated manually to force a sufficient amount of lubricant through the feed conduits 56 and 56' into the feed passage 62 in the shaft 22 to assure initial lubrication of the bearing surfaces of the shaft and bearing sleeve 31. The cooker is then started and the cans are fed therethrough in the manner hereinbefore explained. Upon each revolution of the can discharge turret 11 and the crank 54, the pitman 55 associated therewith oscillates the lever 53 once to drive the pawl and ratchet unit 52 and thereby operate the drive shaft 51 of the pump to force the lubricant into the bearing. The pump is adjusted to inject a measured quantity of oil into the feed conduit 56 at predetermined intervals thereby forcing the oil through the feed passage 62 and port 63 into the space between the bearing surfaces of the shaft 22 and bearing sleeve 31.

The pressure of the treating medium on the outer side of the sealing ring 72 does exceed the sealing capacity of the ring and ordinarily the heat treating medium would be forced through the seal and into the bearing. However, since the shell 1 and tank 87 are in communication with each other by way of the conduit 89, the pressure prevailing within the tank 87 is the same as the pressure of the treating medium in the shell 1. Consequently, a back pressure in direct relation to the pressure prevailing within the shell is established against the oil emitting from the bearing into the oil retaining groove 75 and the pressure of the oil at the inner side of the ring is therefore substantially balanced with the pressure of the treating medium within the shell 1. The pressure differential on the two sides of the sealing ring is therefore minimized to a range well within the sealing capacity of the sealing ring 72 and the ring can therefore function in its normal manner. Since the peripheral lip 73 of the sealing ring will now prevent seepage of lubricant along the shaft 22, the oil injected into the bearing by the pump, after reaching the oil retaining groove 75, will take the course of least resistance and flow through the discharge passages 76, 77, 80, and 84 into the tank 87. The lubricant discharging into the tank 87 can be taken therefrom through a petcock 96 (Fig. 2) at predetermined intervals, as, for instance, whenever the oil pump 50 is refilled.

From the foregoing it is apparent that even though the pressure of the treating medium in the chamber 2 is periodically changed to suit the commodity to be treated or in the event there is a change of pressure during a particular run of canned goods through the shell, the pressure on the bearing and chamber sides of the sealing ring 72 is automatically equalized and therefore the sealing ring can operate in its normal manner to prevent the entry of heat treating medium into the bearing and, conversely, prevent seepage of lubricant into the chamber.

The modified form of bearing shown in Fig. 4 is similar to that of the bearing shown in Fig. 3, previously explained, with this difference: The shaft 22' is supported on two brackets 20 and 20' and both ends of the hub 30 are exposed to the pressure prevailing within the shell 1. Consequently, a sealing ring 72' similar to the sealing ring 72 is provided at the opposite end of the hub 30 and the latter is also provided with an annular groove 75' adjacent the ring 72'. In addition to the above, the passage 77 is extended to within the circumference of the annular groove 75' and communicates with the latter through a port 76'. The feed passage 62 empties into the space between the bearing surfaces of the shaft 22 and sleeve 31 midway the ends of the sleeve so that lubricant is supplied to the bearing centrally thereof for uniform flow toward the outer ends of the bearing surfaces. The lubricant collecting in the grooves 75 and 75' will take the course of least resistance and discharge through ports 76 and 76' into the discharge passage 77 and in all other respects the modification shown in Fig. 4 operates in the same manner as hereinbefore explained concerning the disclosure in Fig. 3.

It will be apparent that the invention disclosed in the two forms previously explained is equally applicable in the event that it is desired to rotate the shaft in a stationary bearing. In other words, the invention herein can be adapted to such structures by merely extending the feed and discharge passages 62 and 77 through the stationary portion of the bearing so that the shaft may be freely rotated therein.

While the apparatus herein is described in detail, it will be appreciated by those skilled in the art that various modifications and alterations may be made without departing from the spirit of the invention. I, therefore, desire to avail myself of all modifications and variations coming within the scope of the appended claims.

What I claim as new and desire to protect by Letters Patent is:

1. A lubricating apparatus for a bearing within a pressure chamber in which the pressure is varied, the combination therewith of means for supplying lubricant by force to said bearing, means associated with said bearing for establishing a seal between the bearing and said chamber, an air tight receptacle for collecting lubricant from said bearing, a conduit communicating said bearing with said receptacle, and a conduit communicating said pressure chamber with said receptacle for establishing a back pressure in the lubricant discharging from said bearing to automatically equalize the pressure of the lubricant with the pressure prevailing within the chamber and thereby prevent leakage of lubricant into said chamber.

2. A lubricating apparatus for a bearing subjected to the pressure of a pressure medium within a pressure chamber comprising means for supplying lubricant by force to said bearing, means for establishing a seal between said bearing and chamber, a pressure tight receptacle, a conduit leading from the bearing side of said seal to said pressure tight receptacle for collecting lubricant discharging from the bearing, and means communicating said chamber and receptacle for establishing a back pressure in the lubricant on the bearing side of said seal for preventing seepage of pressure medium into the bearing.

3. A lubricating apparatus for bearings in a pressure chamber comprising in combination a journal and a body arranged for relative rotation with respect to each other, means for supplying lubricant by force to the bearing surfaces of said journal and body, means for sealing the bearing surfaces of said journal and body relative to said pressure chamber, a closed receptacle for collecting lubricant discharging from the bearing surfaces of said journal and body, and means for communicating said closed receptacle with said chamber for establishing a back pressure in the lubricant on the bearing side of said sealing means to thereby equalize the pressure of the lubricant with the pressure prevailing in the pressure chamber.

4. A lubricating apparatus for a bearing in a pressure chamber, means for supplying lubricant by force to said bearing, means for establishing a seal of limited capacity between the bearing and pressure chamber, a pressure tight receptacle communicating with said bearing for collecting lubricant discharging therefrom, and means communicating said receptacle with said chamber for automatically equalizing the pressure of the lubricant with pressure prevailing in the pressure chamber to thereby minimize the pressure differential on the bearing and chamber sides of said seal to a range well within the sealing capacity of said seal.

5. In a bearing comprising a shaft and a body arranged for relative rotation one with respect to the other within a pressure chamber, means on said body for sealing the bearing surfaces of said shaft and body relative to said chamber, means for forcing lubricant into the space between said bearing surfaces of said shaft and body, means for communicating the bearing side of said sealing means with the pressure chamber to thereby substantially equalize the pressure of the lubricant with the pressure prevailing in said chamber, and means associated with said communicating means for collecting the lubricant discharging from the bearing side of said sealing means.

6. A lubricating apparatus for a bearing within a pressure chamber comprising means for supplying lubricant under pressure to said bearing at a point remote from said chamber, means for sealing that portion of the bearing exposed to said chamber, means for permitting discharge of lubricant from the bearing at a point adjacent said sealing means and having an air tight pocket for collecting lubricant discharged from said bearing, and means for communicating said chamber with said pocket for developing a back pressure on the lubricant discharging from said bearing to minimize the pressure differential on the bearing and chamber sides of said sealing means.

7. A lubricating apparatus for a bearing including a shaft with a hub mounted for rotation thereon within a chamber having fluid under pressure therein, said shaft having a feed and a discharge passage therein communicating with the bearing surfaces of the shaft and hub, means for forcing lubricant through said feed passage towards the periphery of said shaft and for discharging the lubricant through said discharge passage, means providing a seal between said bearing surfaces and said chamber, and means for by-passing fluid under pressure from said chamber to said discharge passage to establish a back pressure on the lubricant therein to thereby overcome the tendency of fluid under pressure to seep through said sealing means from the chamber to the bearing surfaces.

8. A bearing disposed in a pressure chamber and comprising a shaft, a bearing sleeve mounted on said shaft for rotation relative thereto, said shaft having a lubricating opening therein, a pipe connection leading to said opening, means for forcing lubricant through said pipe connection and opening to said bearing sleeve, means for sealing portions of said bearing sleeve relative to said shaft to normally prevent seepage of lubricant into said chamber, a sealed receptacle, said shaft having a discharge passage therein leading from a point adjacent the bearing side of said sealing means to said sealed receptacle, and means for establishing a back pressure on lubricant in said discharge passage in direct relation to the pressure prevailing in said chamber for substantially equalizing the pressure of the lubricant with the pressure prevailing within the pressure chamber.

9. A bearing in a chamber containing fluid under pressure and comprising a shaft, a bearing sleeve mounted on said shaft for rotation relative thereto, said shaft having a lubricating opening therein, a pipe connection leading to said opening, means for forcing lubricant through said pipe connection and opening toward said bearing sleeve, means for sealing portions of said bearing sleeve relative to said shaft to normally prevent seepage of lubricant into said chamber, an air tight receptacle, said shaft having a discharge passage therein leading from a point adjacent the bearing side of said sealing means, means communicating the discharge passage with said air tight receptacle for collecting lubricant discharging from said bearing, and means for communicating said chamber with said air tight receptacle for establishing a back pressure on the lubricant in said bearing for preventing influx of fluid under pressure from said chamber into said bearing through said sealing means.

10. In a bearing exposed to pressure prevailing in a pressure chamber and comprising a shaft and a body having a bearing surface frictionally contacting said shaft for rotation relative thereto, said shaft having a passage therein communicating with said bearing surface, means for forcing lubricant through said passage toward said bearing surface, said body having means thereon for sealing said bearing surface relative to said chamber, said shaft having an opening communicating with said bearing surface at a point adjacent said sealing means, a pipe connection leading from said opening and having an air tight pocket for collecting lubricant discharging from said opening, and means for communicating said chamber with said pocket for establishing a back pressure on the lubricant adjacent the inner side of said sealing means in direct relation to the pressure prevailing within said chamber for preventing seepage of fluid under pressure from said chamber towards said bearing surface through said sealing means.

11. An apparatus for lubricating a bearing exposed to fluid under pressure in a pressure chamber comprising a shaft and a bearing sleeve associated with each other for relative rotation, a conduit leading to said bearing, means connected to said conduit for inducing a flow of lubricant under force toward said bearing, means for sealing said bearing relative to said chamber, a discharge conduit leading away from the bearing side of said sealing means, an air tight receptacle connected to said discharge conduit for collecting lubricant discharging therethrough, and means connecting said chamber with said air tight receptacle for creating a back pressure against the lubricant on the bearing side of said sealing means to thereby reduce the pressure differential on the two sides of the sealing means to a range well within the sealing capacity of the sealing means.

THOS. B. KEESLING.

REFERENCES CITED

The following references are of record in the file of this patent:

UNITED STATES PATENTS

| Number | Name | Date |
|---|---|---|
| 1,840,127 | Penney | Jan. 5, 1937 |
| 2,236,274 | Rice | Mar. 25, 1941 |

FOREIGN PATENTS

| Number | Country | Date |
|---|---|---|
| 37,252 | France | July 22, 1930 |